United States Patent
Landis et al.

(10) Patent No.: US 11,631,646 B2
(45) Date of Patent: Apr. 18, 2023

(54) PROCESS OF REALIZATION ON A PLATE OF A PLURALITY OF CHIPS, EACH WITH AN INDIVIDUALIZATION AREA

(71) Applicant: COMMISSARIAT A L'ENERGIE ATOMIQUE ET AUX ENERGIES ALTERNATIVES, Paris (FR)

(72) Inventors: Stefan Landis, Grenoble (FR); Michaël May, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 129 days.

(21) Appl. No.: 17/216,828

(22) Filed: Mar. 30, 2021

(65) Prior Publication Data
US 2021/0398917 A1    Dec. 23, 2021

(30) Foreign Application Priority Data
Mar. 30, 2020  (FR) ..................................... 20 03111

(51) Int. Cl.
*H01L 23/00* (2006.01)
*H01L 21/768* (2006.01)

(52) U.S. Cl.
CPC ...... *H01L 23/573* (2013.01); *H01L 21/76802* (2013.01); *H01L 21/76877* (2013.01)

(58) Field of Classification Search
CPC ............. H01L 23/573; H01L 21/76802; H01L 21/76877; H04L 2209/12; H04L 9/3278
See application file for complete search history.

(56) References Cited

U.S. PATENT DOCUMENTS 9,391,019 B2 *  7/2016  Kobrinsky ........ H01L 21/76816
11,276,652 B2 *  3/2022  Charpin-Nicolle ... H01L 23/573
(Continued)

FOREIGN PATENT DOCUMENTS

EP    3 418 936 A1    12/2018
FR    2 978 613 A1    2/2013

OTHER PUBLICATIONS

French Preliminary Search Report dated Oct. 29, 2020 in French Application 20 03111 filed on Mar. 30, 2020, 10 pages (with English Translation of Categories of Cited Documents & Written Opinion).

*Primary Examiner* — Bac H Au
(74) *Attorney, Agent, or Firm* — Oblon, McClelland, Maier & Neustadt, L.L.P.

(57) ABSTRACT

A method for producing a plurality of chips each comprising an individualisation region, each chip comprising at least: a first and a second level of the electrical tracks, and an interconnections level comprising vias. The method includes producing on the dielectric layer covering the first level a mask having openings located in line with the electrical tracks and making the dielectric layer accessible. The method includes producing, in a region of the chip comprising the individualisation region, patterns conformed so that: first openings of the hard mask are not masked by the patterns, and second openings of the hard mask are masked by the patterns. The method includes producing via openings in the dielectric layer in line solely with the first openings. The method further includes filling in the via openings with an electrically conductive material, and producing the second level of the electrical tracks on the vias.

15 Claims, 13 Drawing Sheets

SECTION C-C

(56) References Cited

U.S. PATENT DOCUMENTS

| | | |
|---|---|---|
| 2002/0096777 A1 | 7/2002 | Chow et al. |
| 2014/0042627 A1* | 2/2014 | Edelstein ................. G09C 1/00 257/E21.59 |
| 2014/0203448 A1* | 7/2014 | Song .................... H01L 23/576 257/774 |
| 2016/0254235 A1* | 9/2016 | Leobandung ..... H01L 21/28158 257/368 |
| 2018/0358310 A1* | 12/2018 | May ........................ G06F 21/73 |
| 2018/0375670 A1 | 12/2018 | May et al. |
| 2019/0348322 A1* | 11/2019 | Mullick ............ H01L 21/76807 |
| 2019/0378853 A1* | 12/2019 | Xiao ................... H01L 23/5283 |
| 2020/0135663 A1* | 4/2020 | Landis ............. H01L 21/31144 |

* cited by examiner

SECTION A-A

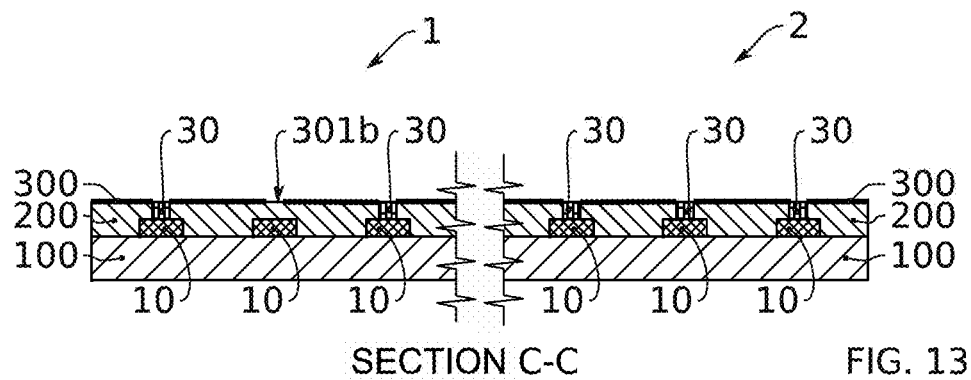
SECTION C-C  FIG. 13
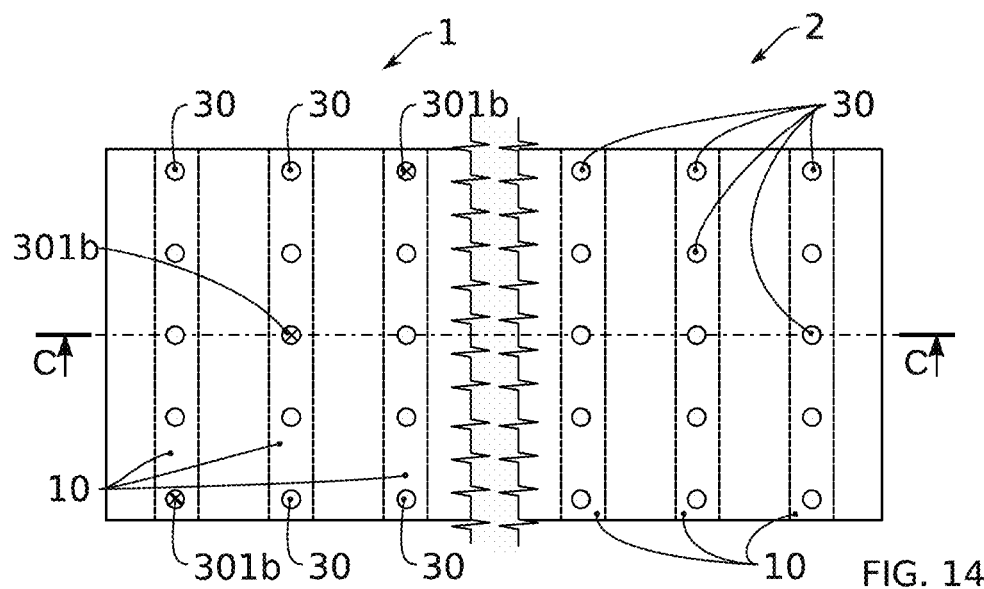
FIG. 14

SECTION C-C

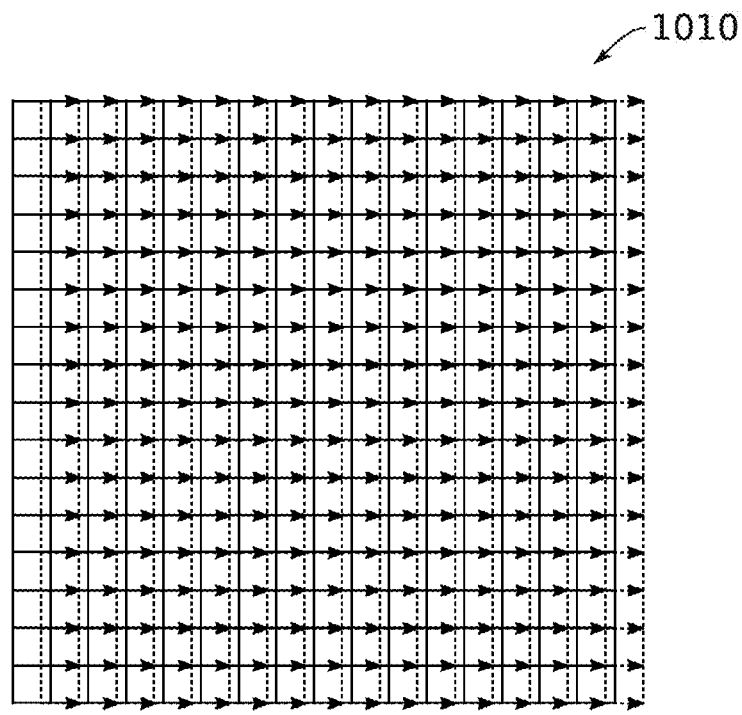
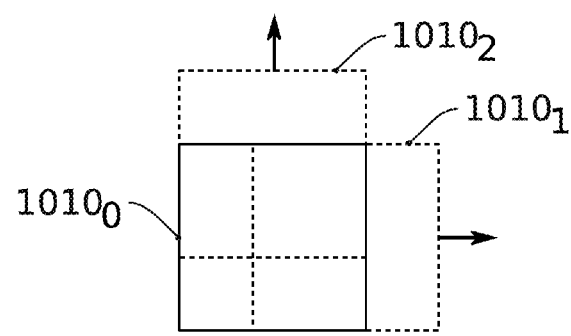
FIG. 20

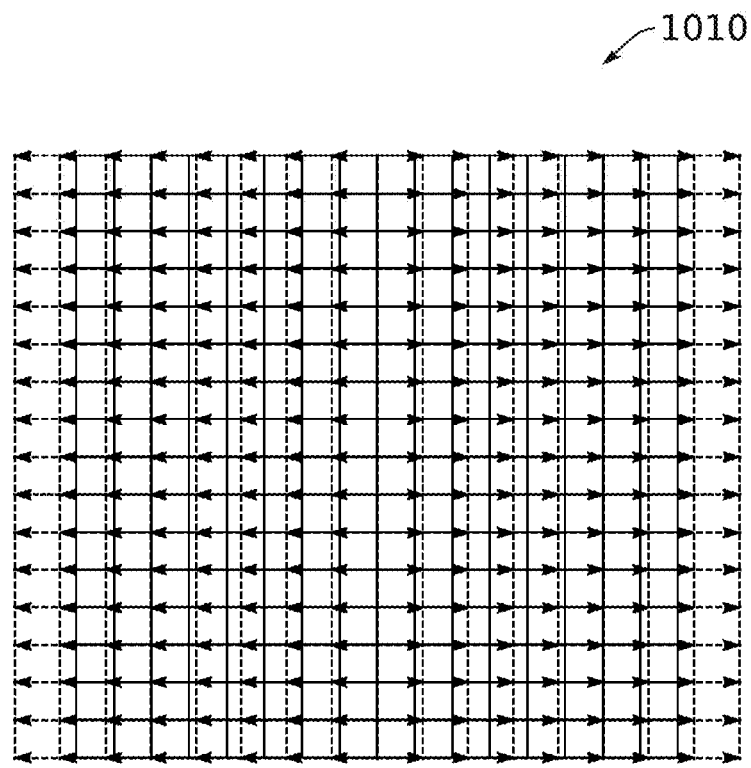
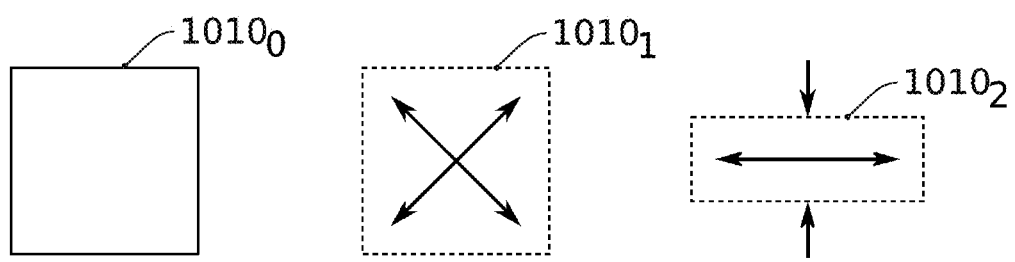
FIG. 21

PROCESS OF REALIZATION ON A PLATE OF A PLURALITY OF CHIPS, EACH WITH AN INDIVIDUALIZATION AREA

TECHNICAL FIELD

The present invention relates to the individualisation of chips comprising integrated circuits. It finds a particularly advantageous application in protecting these chips as well as protecting the components or devices integrating these chips.

TECHNICAL BACKGROUND

Designing and manufacturing unique chips represents a considerable challenge, particularly because of security problems. For example, in order to combat counterfeiting, it is sought to find solutions that make it possible to authenticate a circuit in order to be able to distinguish whether it is a legitimate circuit (successful authentication) or a counterfeit circuit (failed authentication).

One of the solutions consists of manufacturing a circuit that has a unique design. This individualisation of design naturally contradicts the general principle of the microelectronic industry, which consists of the mass production of components that are all identical, with very small disparity between them.

Solutions have been proposed for uniquely identifying an integrated circuit without having to design each integrated circuit uniquely.

For example, some solutions aim to use the functional dispersions inherent in integrated circuits. The resistances of the metal interconnection lines or vias differ from one circuit to another, which causes voltage drops along the path followed by the electrical signal. The response time of the signals therefore differs because of the variability caused with regard to the signal propagation times at the limits of the electronic constraints of the circuit, or because of the instability when the components start up, such as for example the SRAMS memories (the acronym for static random access memory), which have a unique state at each start-up.

However, these solutions are highly sensitive to environmental variations or to ageing. In particular, changes in temperatures, supply voltages or electromagnetic interferences may affect the performances of these solutions by reducing the robustness thereof. Thus the response times of an integrated circuit may change over time. As a result a legitimate circuit may possibly be declared to be counterfeit.

There is therefore a need consisting of limiting, or even resolving, the problems of the known solutions.

SUMMARY

To achieve this objective, according to one embodiment a method for producing, on a wafer, a plurality of chips each comprising an individualisation region is provided. Each chip is intended to comprise at least:
  a first and a second level of the electrical tracks,
  an interconnections level located between the first and second levels of the electrical tracks and including vias intended to electrically connect the electrical tracks of the first level with the electrical tracks of the second level.
The method comprises at least the following steps preferably performed simultaneously for a plurality of chips on the wafer:

providing at least the first level of the electrical tracks and a dielectric layer covering the first level,
  producing on the dielectric layer a mask, preferably a hard mask, having openings located in line with the electrical tracks and making the dielectric layer accessible,
  producing, in a region of the chip intended to comprise the individualisation region, patterns conformed so that:
    first openings of the mask are not masked by the patterns so as to leave the dielectric layer accessible in line with the first openings, and so that
    second openings of the mask are masked by the patterns;
  producing openings, referred to as via openings, in the dielectric layer in line solely with the first openings so as to bare the electrical tracks of the first level,
  filling in the via openings with an electrically conductive material so as to form vias in line solely with the first openings of the mask,
  producing the second level of the electrical tracks on the vias.

Thus the method proposed makes it possible to intentionally, but randomly from one chip to another, degrade the level of metal interconnections of the via type by introducing an additional structuring step. This additional step makes it possible to prevent the creation of vias at certain locations on the hard mask intended to form these vias. Thus the method proposed makes it possible to deactivate certain vias in an individualised manner on each chip on the same wafer.

Consequently it is possible to make the response diagram of the integrated circuit of each chip on a wafer unique. This response will consequently be unique, then forming an individualisation region for the integrated circuit. Moreover, the response diagram of the integrated circuit will be stable over time, unlike the solutions described above in the section relating to the prior art.

It is difficult or even impossible to physically clone the individualisation region. It may be referred to by the acronym PUF (from the English term physically unclonable function). It is therefore possible to make unique the integrated circuit comprising this individualisation region.

The method according to the invention thus proposes a reliable solution that can be implemented easily and at low cost, in order to produce an individualisation region of an integrated circuit.

It will also be noted that this method makes it possible to individualise each chip on the same wafer and each chip from one wafer to another, with the same set of masks used for the pattern lithography steps. The method then makes it possible to keep a limited cost while offering a high individualisation capability.

Thus the method proposed makes it possible, in a perfectly counterintuitive manner, to take advantage of the differences in alignment of patterns between chips of the same wafer or between two wafers produced from the same masks. Another aspect relates to a method for producing a microelectronic device including at least one integrated circuit, the integrated circuit including at least:
  a first and a second level of the electrical tracks,
  a level of interconnections situated between the first and second levels of the electrical tracks and including vias intended to electrically connect the tracks of the first level with the tracks of the second level,
  an individualisation region of the integrated circuit.
The individualisation region is produced using the method described above, preferably on only part of the integrated circuit. Microelectronic device means any type of device produced with microelectronic means.

These devices encompass in particular, in addition to the devices with a purely electronic purpose, micromechanical or electromechanical (MEMS, NEMS, etc.) devices as well as optical or optoelectronic (MOEMS etc.) devices. It may be a case of a device intended to fulfil an electronic, optical, mechanical etc. function. It may also be a case of an intermediate product solely intended for producing another microelectronic device.

BRIEF DESCRIPTION OF THE DRAWINGS

The aims, objects, features and advantages of the invention will emerge better from the detailed description of an embodiment thereof that is illustrated by the following accompanying drawings, wherein:

FIGS. 7 to 17 illustrate steps of a non-limitative example of implementation of a method according to the invention.

FIGS. 20 to 22 illustrate example embodiments wherein positioning and/or deformation correction parameters are used for forming the patterns in order to increase the differences in arrangement of the vias carried by the chips of a wafer. The drawings are given by way of examples and are not limitative of the invention. They constitute schematic outline representations intended to facilitate the understanding of the invention and are not necessarily to the scale of practical applications. In particular, on the outline diagrams, the thicknesses of the various layers, vias and patterns do not represent reality.

DETAILED DESCRIPTION

Figure 1:
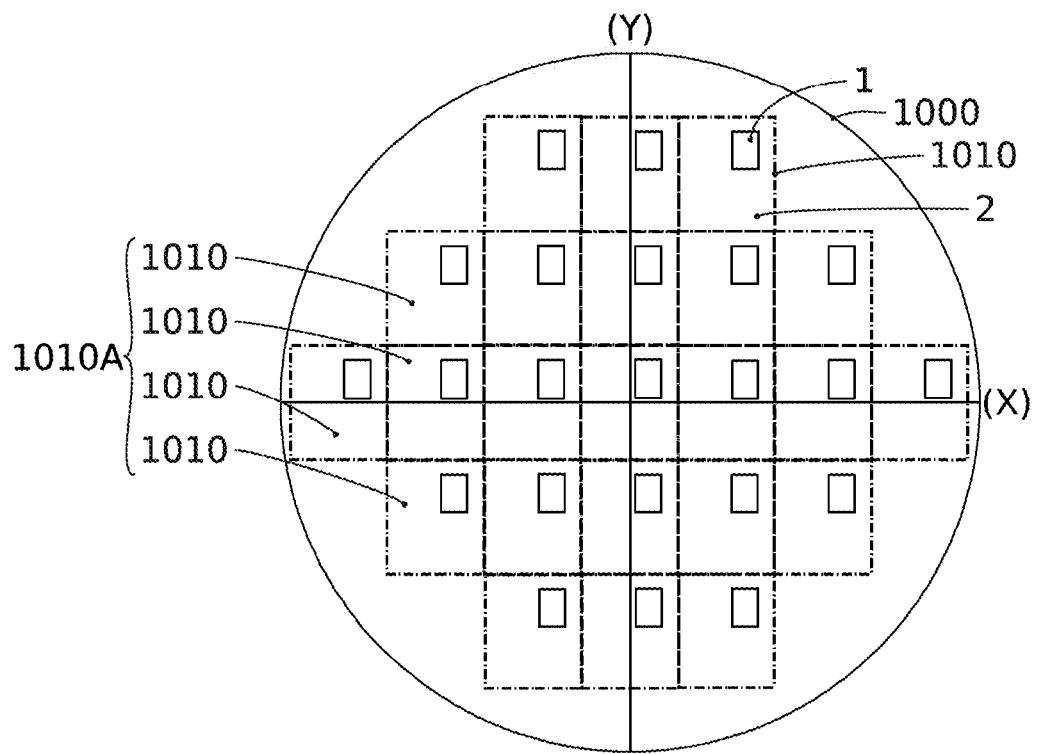
FIG. 1 shows, schematically and in plan view, a wafer comprising a plurality of chips, each chip comprising a functional region and an individualisation region.

Before beginning a detailed review of embodiments of the invention, optional features, which may optionally be used in association or alternatively, are stated below: According to one example, the arrangement of the patterns differs from one chip to another in the plurality of chips through at least one of the following parameters:
position of the patterns on the chip,
dimensions of the patterns,
pitch of the patterns.

According to one example, the arrangement of the patterns is different for each of the chips in the plurality of chips on the wafer. Thus no wafer comprises deactivated vias that have all the same coordinates from one wafer to another.

According to one example, the patterns are based on resin.

According to one example, the tracks of the first level extend along parallel lines, the tracks of the second level extend along parallel lines perpendicular to the tracks of the first level, the patterns extending along lines parallel to each other and inclined with respect to the tracks of the first and of the second level.

According to one example, the patterns form at least one curve and preferably a plurality of curves on the wafer.

According to one example, the patterns form one or more spirals on the wafer. The spiral may have a centre coinciding with the centre of the wafer. According to one example, the distance between the turns of the spiral is not constant. According to one example, the radius of the spiral at one point is not proportional to the angle travelled over the spiral to reach this point.

According to one example, the patterns form a lattice in two dimensions.

According to one example, the patterns form a non-periodic lattice.

According to one example, the pitch between two adjacent patterns varies within the same chip. According to one example, the pitch between two adjacent patterns varies within the same wafer.

According to one example, a number r is determined randomly, the pitch between two adjacent patterns on the same wafer varying as a function of the number r.

According to one example, the step of producing the patterns is implemented by means of lithography equipment. During the step of producing the patterns, deformation and/or positioning corrections are applied to this equipment in order to vary the position and/or the dimensions of the patterns in a chip and/or in a wafer. Thus the position and/or the dimensions of the patterns are not uniform within a chip and/or within a wafer. Thus the possibilities of equipment adjustments are used, so as to reinforce the unique character of each of the individualisation regions.

According to one example, each chip has at least one other region, distinct from the individualisation region, preferably intended to form a functional region for each chip.

According to one example, the first and the second levels of electrical tracks and the interconnection level extend in said at least one other region. According to one example, prior to the production of the patterns, a protective mask is formed, preferably a hard mask, on the region intended to form the functional region, this protective mask not covering the region of the chip intended to comprise the individualisation region.

This protective mask prevents said step of producing via openings in the dielectric layer.

This protective mask is preserved when the openings are produced in the dielectric layer in line with the first openings of the hard mask. This example embodiment has the advantage of protecting the functional region during the step of producing the patterns.

This is because, when these patterns are produced by deposition of resin and then insolation, the insolation step may damage the parts of the circuit of the functional region. Adding a protective mask effectively remedies this problem.

According to one example, a lithography mask is used for producing the patterns on a plurality of chips of a first wafer and this same lithography mask is used for producing patterns on a plurality of chips of a second wafer different from the first wafer. According to one example, the lithography mask is positioned, in relation to the first wafer, in a first positioning in order to produce the patterns on the first wafer, and the lithography mask is positioned, in relation to the second wafer, in a second positioning, different from the first positioning, in order to produce the patterns on the second wafer.

According to one example, in order to pass from the first positioning to the second positioning, the mask is pivoted about an axis substantially perpendicular to a plane wherein a front face of the hard mask mainly extends. Thus, with the same lithography equipment, chips are obtained having unique individualisation regions between chips on the same wafer and between chips on two different wafers.

According to one example, the random patterns are produced solely in the at least one individualisation region. The integrated circuit has at least one other region, distinct from the individualisation region, preferably intended to form a functional region for the integrated circuit. This other region has a larger surface area than the surface area of the individualisation region. The first and the second levels of electrical tracks and the interconnection level extend in said at least one other region.

It is stated that, in the context of the present invention, the term via incorporates all electrical connections such as pads, lines and conductive structures that extend, preferably perpendicularly, between two layers, successive or not, of the integrated circuit, i.e. between two levels of electrical tracks. Each level of the electrical tracks extends mainly in a plane and may include functional micromechanical structures such as transistors for example. Preferably, the vias each form a pad, with a substantially circular cross section.

In the context of the present invention, a via has a critical dimension $CD_{via}$, for example a diameter, taken along a cross section parallel to the various levels of the integrated electrical tracks. Preferably, $CD_{via}$ is less than 50 µm. $CD_{via}$ is preferably between 10 nm and 50 µm. Preferably, $CD_{via}$, is between 10 nm and 10 µm.

It is stated that, in the context of the present invention, the terms "on", "surmounts", "covers", "underlying" and "facing" and the equivalents thereof do not necessarily mean "in contact with". Thus, for example, depositing, transferring, adhesively bonding, assembling or applying a first layer on a second layer does not necessarily mean that the two layers are directly in contact with each other, but signifies that the first layer at least partially covers the second layer while being either directly in contact therewith or being separated therefrom by at least one other layer or at least one other element. A layer may moreover be composed of a plurality of sublayers of the same material or of different materials.

A substrate, a film or a layer "based on" a material A, means a substrate, a film or a layer comprising this material A solely or this material A and optionally other materials, for example doping elements.

A plurality of embodiments of the invention implementing successive steps of the manufacturing method are described below. Unless explicitly mentioned, the adjective "successive" does not necessarily mean, even if this is generally preferred, that the steps follow each other immediately, intermediate steps being able to separate them.

Moreover, the term "step" means the implementation of a part of the method, and may designate a set of substeps.

Moreover, the term "step" does not necessarily mean that the actions performed during a step are simultaneous or immediately successive. Some actions in a first step may in particular by followed by actions related to a different step, and other actions in the first step may then be resumed. Thus the first step does not necessarily mean actions that are unitary and inseparable in time and in the concatenation of the phases of the method.

The term "dielectric" qualifies a material the electrical conductivity of which is sufficiently low in the given application to serve as an insulator. In the present invention, a dielectric material preferably has a dielectric constant of less than 7. "Etching selective with respect to" or "etching having a selectivity with respect to" means an etching configured to remove a material A or a layer A with respect to a material B or a layer B, and having a speed of etching of the material A greater than the speed of etching of the material B. The selectivity is the ratio between the speed of etching of the material A and the speed of etching of the material B.

In the context of the present invention, resin means an organic or organomineral material that can be shaped by an exposure to a beam of electrons, photons or X-rays or mechanically.

Mention can be made, by way of example of resins conventionally used in microelectronics, resins based on polystyrene (PS), methacrylate (for example polymethyl methacrylate PMMA), hydrosilsesquioxane (HSQ), polyhydroxystyrene (PHS) etc. The advantage of using a resin is that it is easy to deposit a large thickness thereof, from several hundreds of nanometres to several microns.

It is stated that, in the context of the present invention, the thickness of a layer of the substrate is measured in a direction perpendicular to the surface over which this layer of this substrate has its maximum extension. The thickness is taken in a direction perpendicular to the main faces of the substrate on which the various layers rest. On the figures, the thickness is taken vertically.

An element located "vertically above" or "in line with" another element means that these two elements are both located on the same line perpendicular to a plane wherein a bottom or top face of a substrate mainly extends, that is to say on the same line oriented vertically in the figures.

FIG. 1 shows a plate 1000 on which a plurality 1010A of chips 1010 are produced. This plate is normally referred to by its English term wafer.

Each chip 1010 comprises at least one integrated circuit. One part of the integrated circuit of the chip 1010 forms at least one functional region 2 and another part of the integrated circuit forms at least one individualisation region 1.

Conventionally, the integrated circuit of the functional region 2 comprises logic inputs and outputs. This functional region 2 is intended to provide logic functions for the expected operation of the integrated circuit. Apart from the electrical tracks 10, 20, this functional region 2 may optionally comprise microelectronic structures, such as for example transistors, diodes, MEMS etc.

As for the individualisation region 1, the function of this is to make unique each integrated circuit, that is to say each chip.

Figure 2:
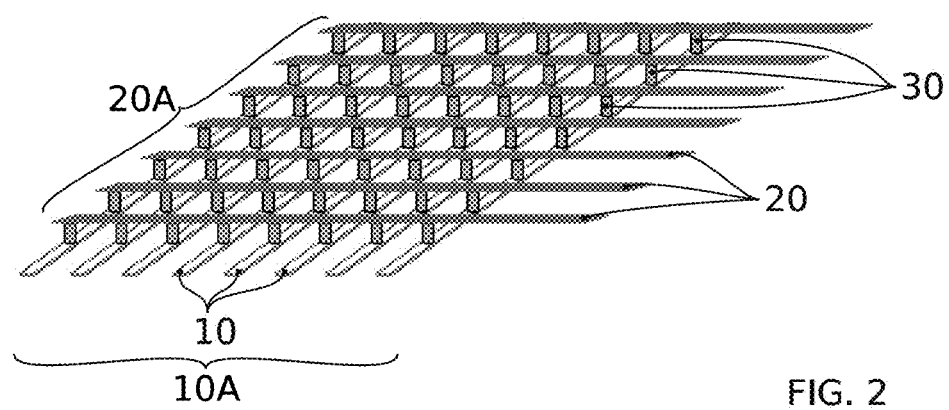
FIG. 2 shows, schematically and in perspective, an integrated circuit comprising a first and a second level of the electrical tracks, as well as an interconnection level comprising vias. The vias electrically connect electrical tracks of the first level with electrical tracks of the second level.

FIG. 2 shows schematically a portion of an integrated circuit included in a chip 1010 and comprising a first level 10A of the electrical tracks 10, and a second level 20A of the electrical tracks 20. Each of these levels 10A, 20A extends mainly in a plane. These planes are substantially parallel to each other and to a substrate, not illustrated, on which these first 10A and second 20A levels of electrical tracks 10, 20 rest. The integrated circuit also comprises an interconnections level configured to electrically connect the tracks of the first level 10A with tracks of the second level 20A, optionally redundantly. This interconnections level comprises conductive portions generally referred to as vias 30. It should be noted that vias 30 can connect tracks of two levels that are not adjacent but which are themselves separated by one or more other levels.

In order to produce the individualisation region 1, and as will be detailed hereinafter, during the manufacturing method provision is made for randomly degrading the interconnections level comprising the vias 30 so that it is possible to individualise each chip 1010 of the same wafer 1000. Preferably, this individualisation of the chips 1010 is obtained with the same set of masks used for the photolithography steps.

Figure 3:
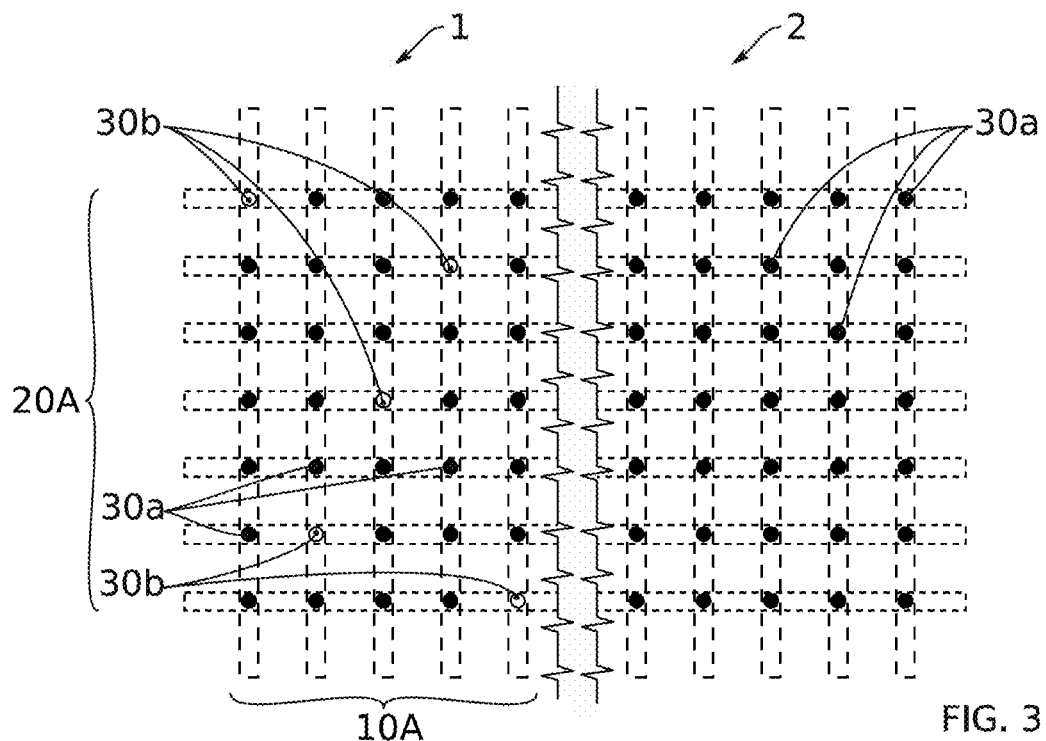
FIG. 3 shows, schematically and in plan view, an individualisation region and a functional region of an integrated circuit obtained by implementing the method according to the invention.

Each chip 1010 can therefore be identified uniquely. FIG. 3 illustrates a chip 1010 comprising an individualisation region 1 and a functional region 2. In this figure, it can be seen that vias 30a are functional, that is to say they allow an electrical connection between the two levels 10A, 20A of electrical tracks, whereas other vias 30b are inactive. The principle is that, for each functional region 2, a unique network of functional vias 30a and of inactive vias 30b is available. A logic challenge is applied to the inputs (tracks 10 of the first level 10A for example) and then the logic state at the output (tracks 20 of the second level 20A for this same example) is measured. The network of vias 30a, 30b being different for each chip 1010, the response of each chip is unique, thus making it possible to individualise and uniquely identify the components integrating these chips 1010. The individualisation region 1 may be termed PUF region and the functional region 2 may be termed non-PUF region.

According to one example embodiment, the unique character of each network of functional vias 30a and inactive vias 30b is obtained by providing a structuring step that makes it possible to deactivate certain vias in order to make them inactive and no longer functional.

Figure 4:
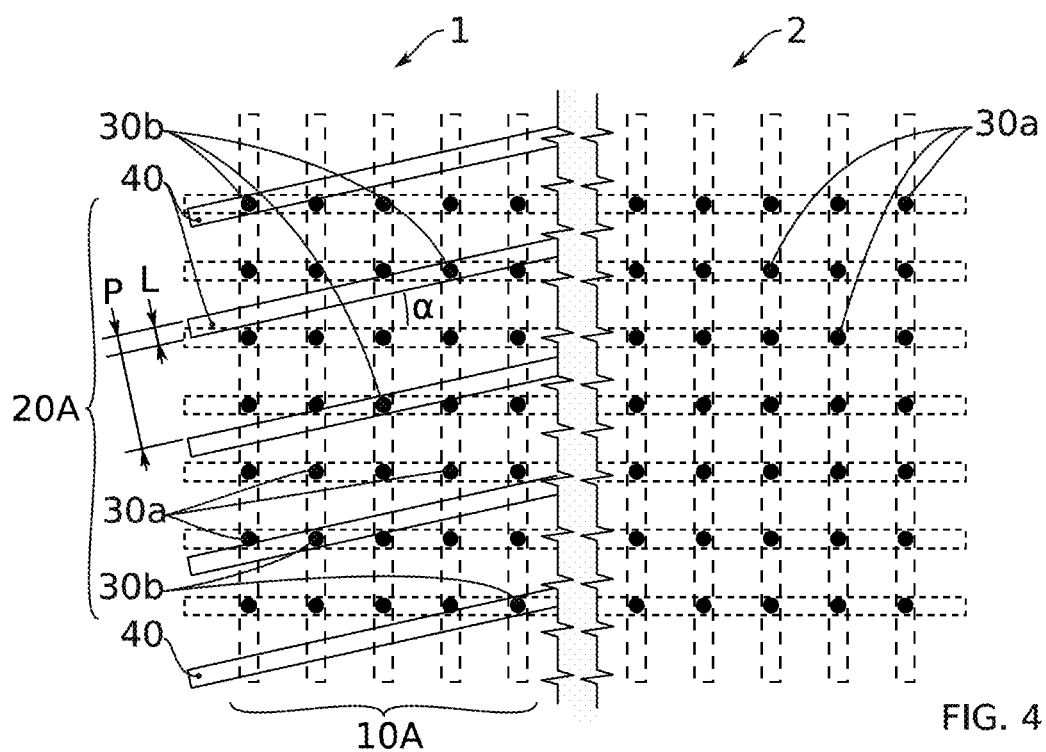
FIG. 4 shows, schematically and in plan view, an intermediate step of the method according to the invention making it possible to obtain the integrated circuit illustrated in FIG. 3.

For this purpose, and as illustrated schematically in FIG. 4, after having produced the first level 10A of electrical tracks 10, and after having defined the location of the vias, patterns 40 are formed so that some of these patterns 40 mask the location of the vias.

On the example illustrated in FIG. 4, these patterns form a network of lines offset with respect to the grid formed by the levels 10A and 20A of electrical tracks 10, 20. In this example, this offset consists of an inclination by an angle α, referenced in FIG. 4. The vias the location of which is masked by the patterns 40 will not allow the formation of an electrical connection. These vias will therefore not be functional. They will be inactive and will uniquely define the individualisation region 1.

Figure 5:
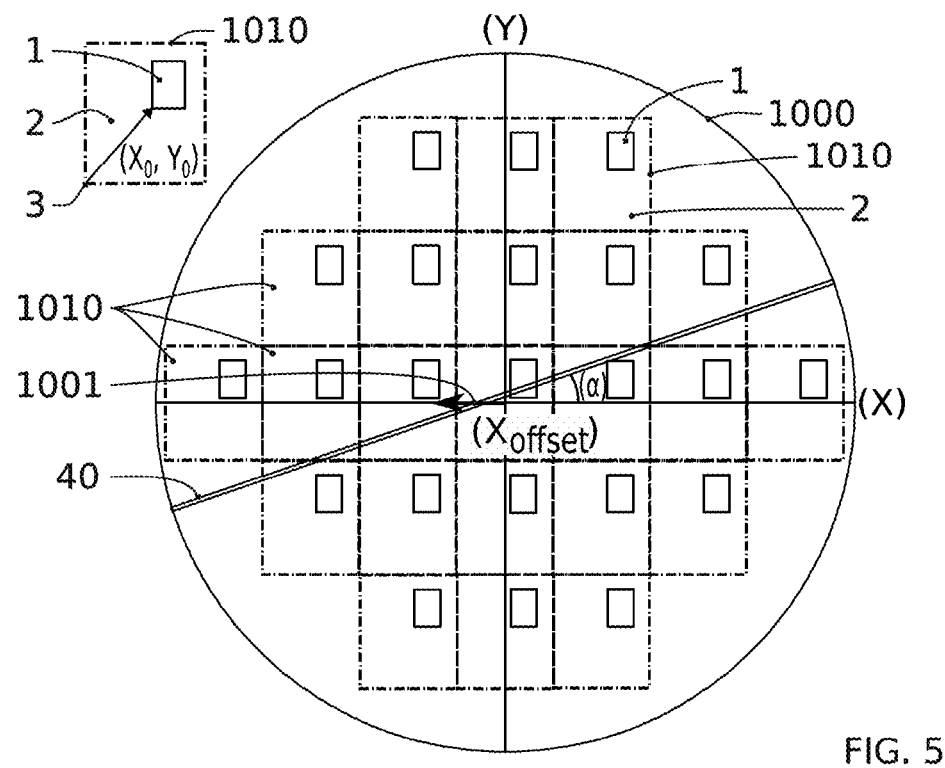
FIG. 5 is a plan view of a wafer comprising a plurality of chips each integrating an individualisation region. On this figure, a single pattern used for implementing the present invention is illustrated.
Figure 6:
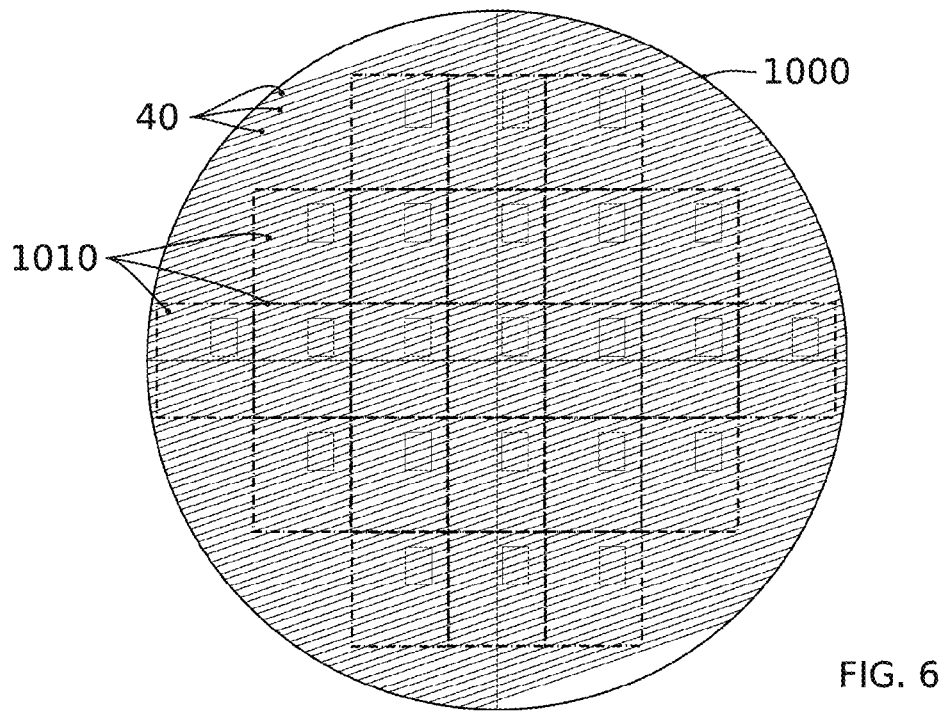
FIG. 6 shows the wafer of FIG. 5 and illustrates the patterns extending over the entire wafer.

FIG. 5 illustrates this approach to the scale of the wafer 1000. This wafer is identical to the one in FIG. 1 except that a pattern 40 is illustrated. For reasons of clarity, only one pattern is illustrated in FIG. 5. On the other hand, in FIG. 6, a complete network of patterns 40 is illustrated. This network preferably covers the whole of the wafer 1000.

During the manufacturing method, the wafer 1000 is virtually partitioned into chips 1010. In each chip 1010, the position of the individualisation region 1 is marked by coordinates $X_0$, $Y_0$. The values $X_0=0$ and $Y_0=0$ correspond to the origin 3 of the chip, for example the corner at the bottom left thereof.

The patterns 40 are produced by one of the known lithography techniques, for example by optical lithography, by electron-beam lithography, or by nanoprinting. These patterns 40 are preferably patterns made from a resin or based on resin.

This network of parallel lines, typically the centre of symmetry of this network, is inclined by an angle α with respect to the axes (X, Y) of the wafer 1000. Moreover, the centre of symmetry of this network is preferably offset with respect to the origin of the wafer 1000. This offset 1001 is denoted $X_{offset}$ in FIG. 5. The origin of the wafer 1000 corresponds to the values X=0 and Y=0. By distributing the patterns 40 over the whole of the wafer 1000, in this example with a period P, it is possible to produce the individualisation region 1 for a plurality 1010A of chips 1010 of the wafer 1000 and preferably for all the chips 1010 of the wafer 1000. Thus these numerous individualisation regions 1 are produced in the course of the common steps. Through the arrangement of the patterns 40 on the wafer 1000, i.e. in this case through the inclination of the network of lines with respect to the organisation (square network) of the vias, the number of deactivated via is different between each chip 1010 of the wafer 1000. Thus each individualisation region 1, and therefore each chip 1010, is unique on the wafer 1000. As we shall see hereinafter, each chip 1010 is also unique for a batch of wafers 1000.

The random character of the patterns stems from at least one of the following parameters:

the orientation of the patterns 40 with respect to the networks of tracks 10, 20 of the first 10A and second 20A levels of electrical tracks, the pitch of the patterns 40. This pitch P is referenced in FIG. 4. This pitch P may vary to the scale of a chip 1010 and/or to the scale of the wafer 1000;

the form of the patterns. In the example illustrated in FIGS. 4, 5 and 6, the patterns form straight lines. According to another example, the patterns may form curved lines. The patterns may form a non-periodic network. Thus the period separating two patterns varies to the scale of a chip 1010 and/or to the scale of the wafer 1000. According to another example, the patterns may form one or more spirals. For example, the centre of a spiral may correspond to the centre of the wafer 1000. Alternatively, the centre of the spiral may be offset with respect to the centre of the wafer 1000. The patterns may also be punctiform patterns, identical or not, distributed over the whole of the wafer, periodically or non-periodically.

A non-limitative example of embodiment of an integrated circuit comprising an individualisation region 1 and a functional region 2 will now be described in detail with reference to FIGS. 7 to 17. The example described below relates to the manufacture of semiconductor compounds at the back end, that is to say when the levels of electrical interconnections are produced.

Figure 7:
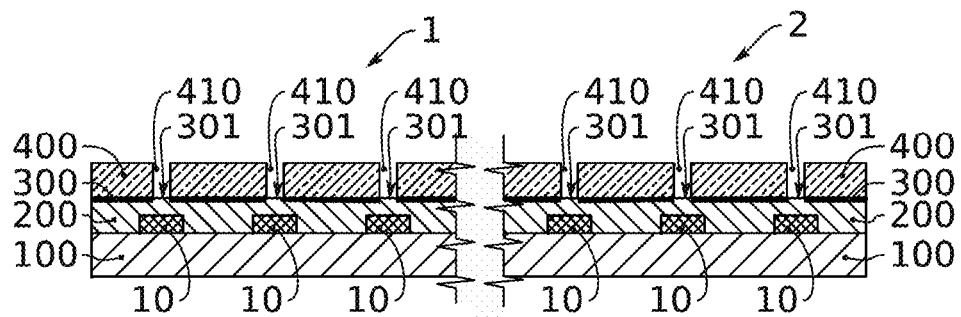

FIG. 7 illustrates a step where a wafer 1000 is provided, comprising a region intended to form an individualisation region 1 and a region intended to form the functional region 2. The wafer 1000 is formed or comprises a stack comprising:

a support layer 100, made from a dielectric material, for example a dielectric substrate. This support layer 100 is for example formed from $SiO_2$;

the first level 10A of electrical tracks 10. These electrical tracks 10 are formed from a conductive material such as copper;

at least one dielectric layer 200 encapsulating the first level 10A of electrical tracks 10. This dielectric layer also has the function of forming a barrier against the diffusion of copper. This dielectric layer 200 is for example formed from $SiO_2$.

The stack may also comprise a mask 300 having openings 301 baring the dielectric layer 200. Preferably, the mask 300 is a hard mask. This hard mask is for example formed from a stack of two layers: a first layer disposed in contact with or facing the electrical layer 200 and a second layer surmounting the first layer. This hard mask 300 can be termed a dual-layer mask. According to one example the first layer is an oxide such as silicon oxide ($SiO_2$) and the second layer is a nitride such as silicon nitride (SiN). According to another example, the first layer is a nitride such as silicon nitride (SiN) and the second layer is an oxide such as a silicon oxide ($SiO_2$).

The mask 300 is surmounted by a mask 400 having openings 410. It is these openings 410 of the mask 400 that served to open the hard mask 300. The function of these openings 301 in the masks 300, 400 is to define, during a subsequent step, the vias 30 in the dielectric layer 200. The openings 410, 301 are situated in line with the electrical tracks 10.

The nature of the mask 400 is dependent on the techniques used for producing the openings 410. FIG. 7 illustrates a uniform mask 400. Naturally, this mask 400, or the layer from which this mask 400 is formed, can be formed from a stack of layers. For example, to obtain the mask 400, it is possible to deposit, on the hard mask 300, a layer comprising two layers of etching mask of the SOC (spin on carbon) type and SiARC (silicon anti-reflective coating) type, as well as a layer of photosensitive resin.

The thicknesses of these three layers vary according to the nature of products used as well as dimensions of the vias sought. They are typically in the order of 150 nm for the SOC, 30 nm for the SiARC and approximately 100 nm for the resin. Alternatively, the mask 400 may be formed from a simple stack of resin comprising a layer of resin and a coating of the BARC type (bottom anti-reflective coating). Preferably, these layers are deposited by a conventional spin coating method (with a spinner or by centrifugation). This stack, in particular the hard mask 300 and the resin mask 400, is produced using conventional lithography techniques, such as optical lithography, electron beam (ebeam) lithography, nanoprinting lithography or any other lithography technique known to a person skilled in the art.

For example, in order to produce the openings 301 of the hard mask 300 by optical lithography, it is possible to insolate certain regions of the resin mask 400 and then, after development, the openings 410 are obtained. These openings 410 next make it possible to etch the hard mask 300 in line with the openings 410.

It should be noted that, at this stage, the individualisation region 1 and the functional region 2 may be perfectly identical.

Figure 8:
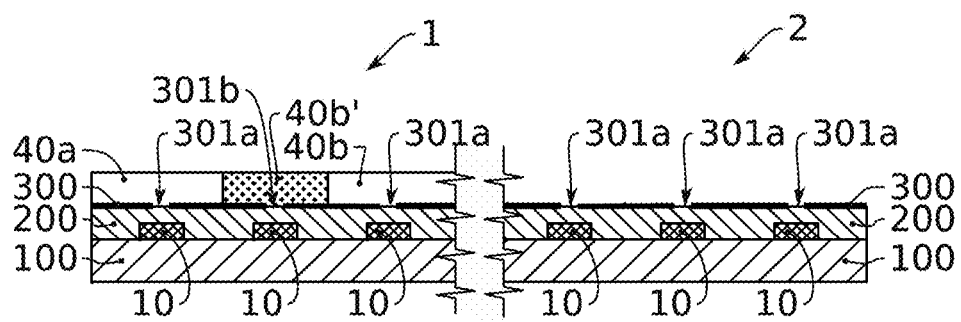
Figure 9:
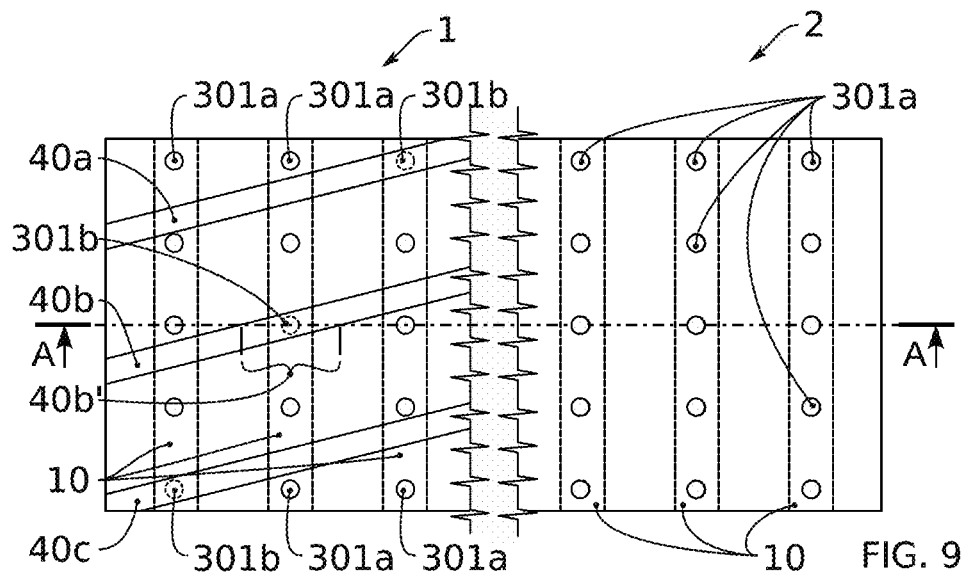

Next an additional structuring level is produced on the individualisation region 1. This additional structuring level consists in forming the patterns 40. FIG. 9 is a plan view illustrating this step. FIG. 8 illustrates this step in cross section along the section AA referenced in FIG. 9.

In this example, these patterns 40 form parallel lines 40a, 40b, 40c. These lines are inclined with respect to the principal axes along which the networks of electrical tracks 10, 20 extend. These lines 40a, 40b, 40c cover some of the openings and leave other openings not masked. The non-masked openings are referenced 301a. They make accessible the portions of dielectric layer 200 situated in line with the openings 301.

The opening masked by the patterns 40 are referenced 301b. FIG. 8 shows a portion 40b', seen in cross section, of the line 40b. This FIG. 8 also shows a flank of this line 40b and a flank of the adjacent line 40a. This line 40b masks the opening 301b situated at the centre of the individualisation region 1.

It will be noted that the functional region 2 is not covered by the patterns 40. To achieve this result, it is naturally possible to make provision for producing the patterns 40 on the whole of the wafer 1000 and then for removing these patterns solely in the functional regions 2 of each chip 1010. It is also possible to make provision for protecting the functional regions 2 in advance with a layer of resin. This makes it possible not to damage the layers of the stack, in particular the electrical tracks 10 when the patterns 40 are removed.

Another solution may consist of producing an additional hard mask that protects the functional regions 2 during the insolation step. For this purpose, provision is made for forming, on top of the hard mask 300, an additional hard mask. If the hard mask 300 is formed by an $SiN/SiO_2$ stack, this additional hard mask may be formed from SiN. This makes it possible to implement a selective etching of this additional hard mask with respect to the underlying stack of the hard mask of $SiN/SiO_2$. After this additional hard mask is formed, an additional lithography step and etching step are provided in order to open the additional hard mask in the individualisation regions 1. This additional hard mask is preserved in the functional regions 2. It thus protects these functional regions 2 during subsequent steps, in particular during insolation steps.

Another solution consists of producing the patterns 40 only on the individualisation region or regions 1.

Figure 10:
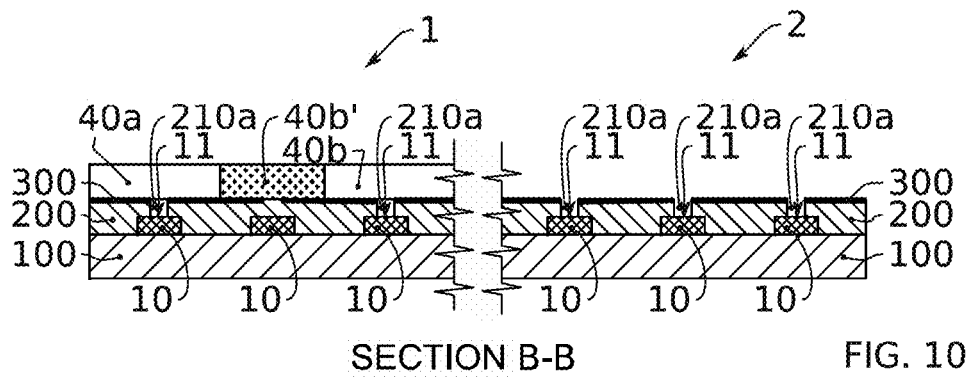
Figure 11:
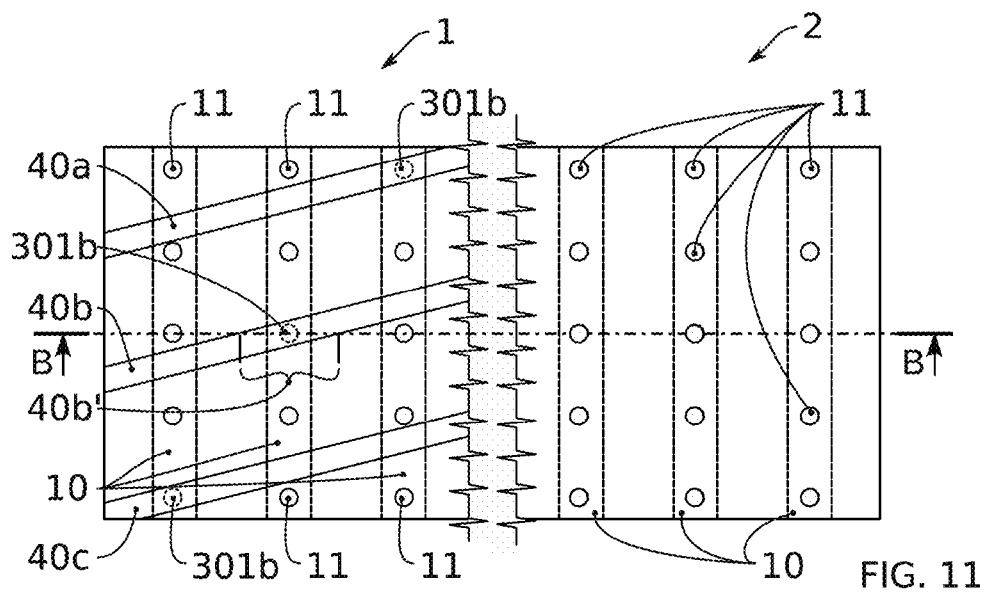

As illustrated in FIGS. 10 and 11, after the patterns 40 are produced, the dielectric layer 200 is opened in line with the non-masked openings 301a. For this purpose, it is possible to use an etching solution that is selective of the material of the electrical layer 200 with respect to the material forming the hard mask 300. Alternatively, it is possible to use a dry etching, by plasma. This etching of the electrical layer 200 forms hollows, referred to as via openings 210a. This is because these openings are intended to be filled with a conductive material to form vias.

Preferably, the etching is implemented so as to emerge on the electrical tracks 10 of the first level 10A. In the bottom of these openings, a portion 11 of the electrical tracks 10 is thus made accessible. These portions 11 have, seen from above, a cross section corresponding to the vias that it is wished to produce.

FIG. 11 illustrates in a solid contour, these vias emerging on the portions 11 of the electrical tracks 10. This FIG. 11 illustrates in broken lines the openings 301b masked by the patterns 40. Naturally, in the functional region 2, the electrical tracks 10 are made accessible in line with each of the openings 210a of the hard mask 300. Preferably, the opening of the hard mask 300 formed by the electrical layer 200 is obtained by plasma etching.

Figure 12:
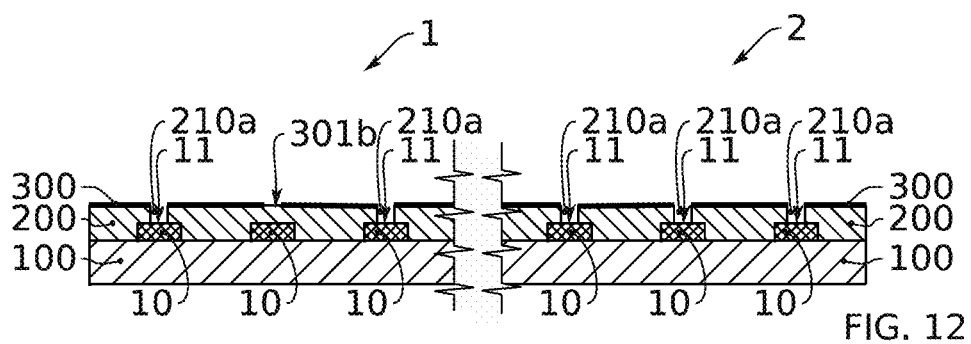

As illustrated in FIG. 12, the patterns 40 are next removed, preferably by a conventional stripping step.

As illustrated in FIGS. 13 and 14, the openings 210a emerging on the electrical tracks 10 are then filled with an electrically conductive material such as copper. Preferably, the openings 210a are entirely filled with the conductive material. If the filling exceeds the height of the openings, or vias, then it is possible to provide a flattening step, such as a CMP step, to remove the excess conductive material. Functional vias 30 are thus formed.

The electrically conductive material does not form any via in line with the openings 301b previously masked by the patterns 40. These openings 301b are represented by a cross in FIG. 14 to reflect the absence of vertical electrical connection with the electrical tracks 10.

Figure 15:
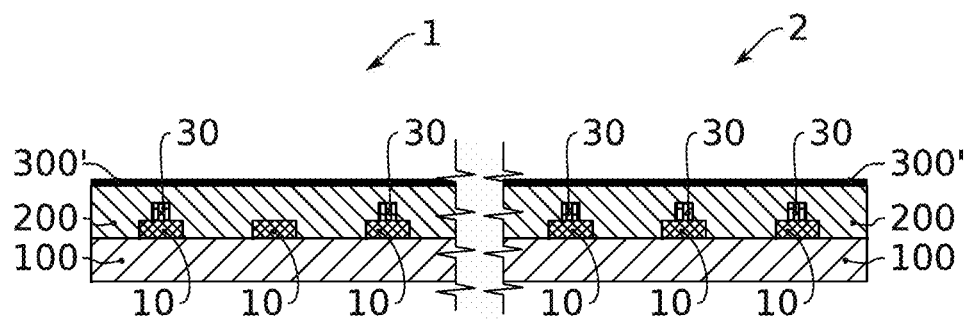
Figure 16:
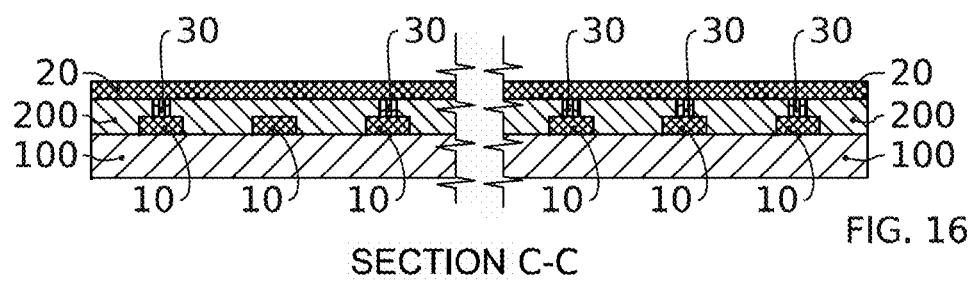
Figure 17:
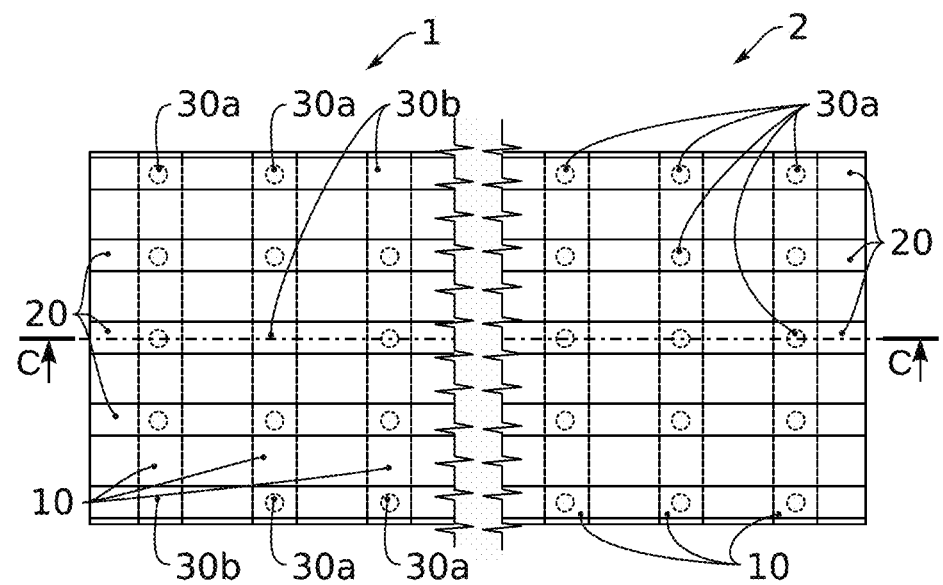

FIG. 15 illustrates the deposition of an additional layer of a dielectric, for example a layer of silicon oxide surmounted by a layer 300' of silicon nitride. This dielectric layer, possibly formed by a plurality of layers, encapsulates the electrical connections 30. As illustrated in FIGS. 16 and 17 the electrical tracks 20 of the second level 20A are next produced. These electrical tracks 20 are in contact with the electrical connections 30.

Optionally, after the deposition of the layer of oxide and before deposition of the electrical tracks 20 of the second level 20A, a flattening step (CMP for example) is implemented, preferably without making accessible the electrical connections 30, i.e. the tops of the vias.

As illustrated in FIG. 17, in the individualisation region 1, some vias, referenced 30a, are functional since they electrically connect the tracks 10 of the first level 10A with the tracks 20 of the second level 20A. Other vias, referenced 30b, are inactive since they do not provide any connection between the tracks 10, 20 of the first 10A and second 20A levels. In the functional region 2, all the vias are functional.

In the case where openings 210a of the hard mask 300 are partially covered by a pattern 40, it may happen that the etching of the electrical layer 200 is only partial. The openings of vias 210a will then be partially open. In order to avoid these via openings having a negative role on the reliability over time of the individualisation region 2 and causing the response of the latter to vary over time, it is possible to provide a treatment for eliminating these vias. For example, after filling with an electrically conductive material, it is possible to apply a voltage higher than the breakdown voltage. This step is naturally only optional.

Non-Limitative Example Embodiment

The following paragraphs describe a particular example embodiment of a method according to the invention. This example shows clearly the unique character of each of the chips that is obtained using the method proposed.

In this example, 10 wafers were manufactured. Each wafer comprises 81 chips. The following table presents the conditions under which this example embodiment was implemented. This table indicates in particular the diameter of the wafer, as well as the size of the chips, the size of the individualisation regions and the period of the vias. In this example, the patterns are straight lines forming a periodic network. The table indicates the period of this network, the inclination of the straight lines and the width of the lines. In this example, the vias have a circular cross section, the diameter of which is indicated in the table.

TABLE 1

| Parameter | Value |
|---|---|
| Size of wafer (mm) | 200 |
| Size of chips along X (mm) | 22 |
| Size of chips along Y (mm) | 22 |
| $X_0$ (mm) | 14 |
| $Y_0$ (mm) | 18 |
| Size of region to be protected along X (µm) | 50 |
| Size of region to be protected along Y (µm) | 10 |
| Period of vias along X (nm) | 140 |
| Period of vias along Y (nm) | 140 |
| Period of network of inclined lines (µm) | 1 |
| $X_{offset}$ (µm) | −174 |
| $\alpha(°)$ | 0.027 |
| Diameter of the via (nm) | 70 |
| Width of line (nm) | 100 |
| Number of wafers in question | 10 |
| Number of chips per wafer | 81 |
| Increment on $X_{offset}$ per wafer (µm) | 229,714 |

TABLE 2

| Parameter | Value |
|---|---|
| Number of vias in a region to be protected | 25347 |
| Total number of chips manufactured | 810 |

Figure 18:
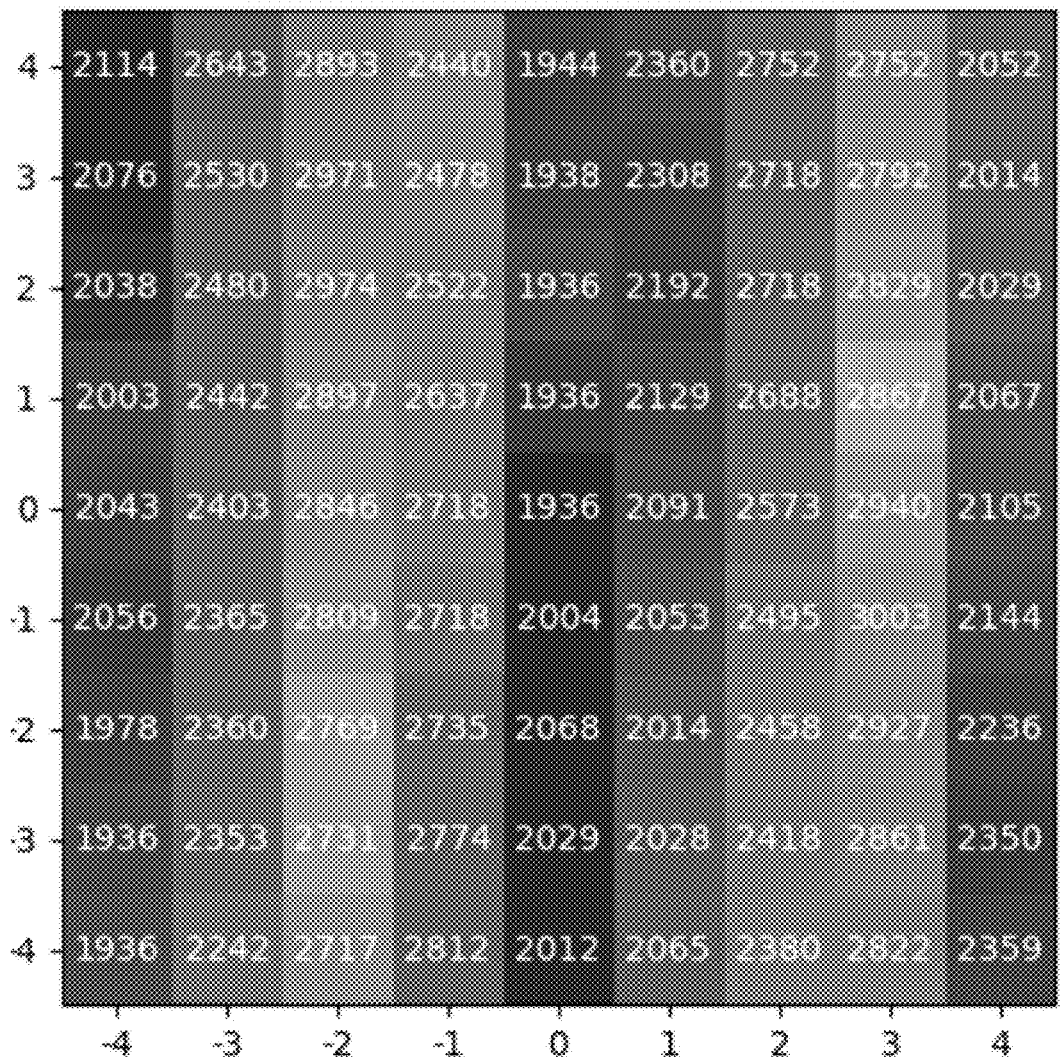
FIG. 18 shows, in the form of a table, the number of vias deactivated for each of the chips of a wafer.

For each wafer, it is possible to calculate the number of vias masked by the patterns and which will therefore be deactivated, that is to say non-functional. FIG. 18 shows schematically the arrangement of 81 chips on one of the wafers manufactured. Each square of the matrix thus corresponds to one chip. For each of these chips, this FIG. 18 indicates the number of vias deactivated. Naturally, in the absence of the patterns intended to mask certain vias, each of these chips would have the same number of functional vias in the individualisation region 1. This number of functional vias would correspond to the number of vias defined initially in the hard mask 300. In this example, this number of vias is 25347.

Because of the disorientation of the network of lines with respect to the organisation (square network) of vias, it is seen in this FIG. 18 that the number of deactivated vias is different from one chip to another.

FIGS. 19A to 19D are graphs illustrating the occurrences for the chips having the same number of deactivated vias, for the set of ten wafers manufactured.

Figure 19A:
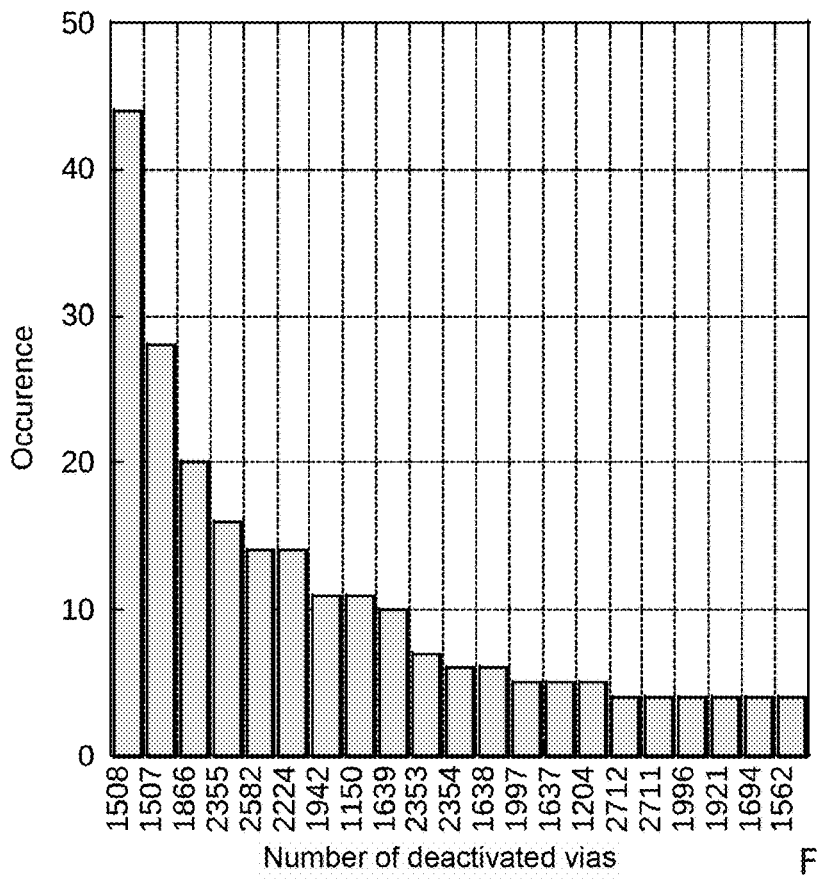
FIGS. 19A to 19D are graphs illustrating the number of chips having an identical number of deactivated vias for a batch of ten wafers.
Figure 19B:
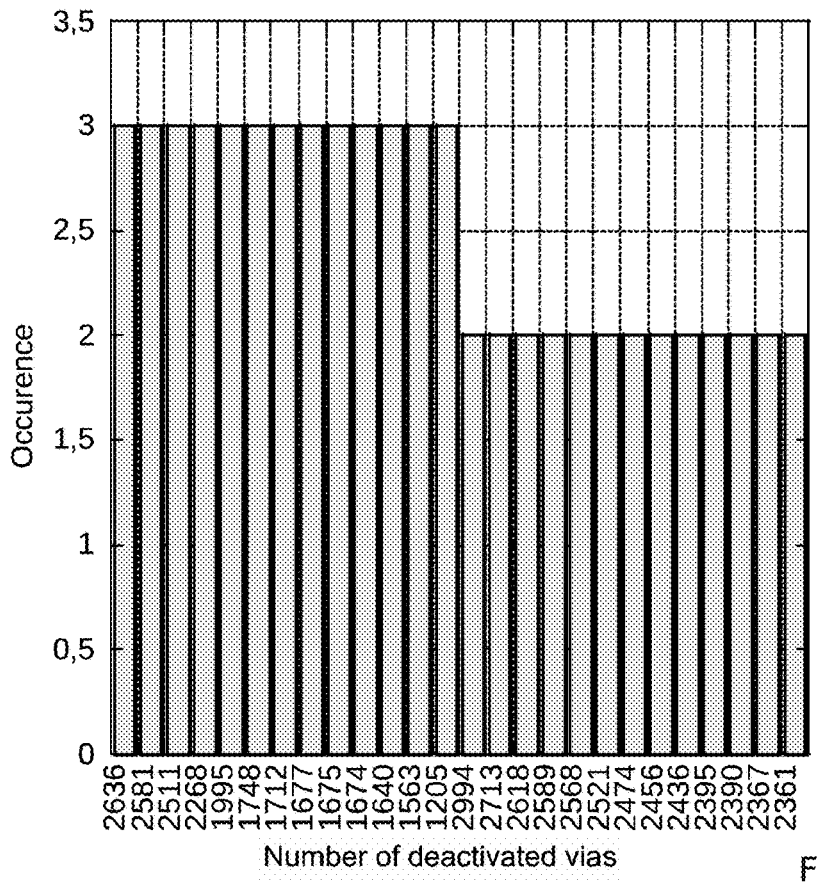
Figure 19C:
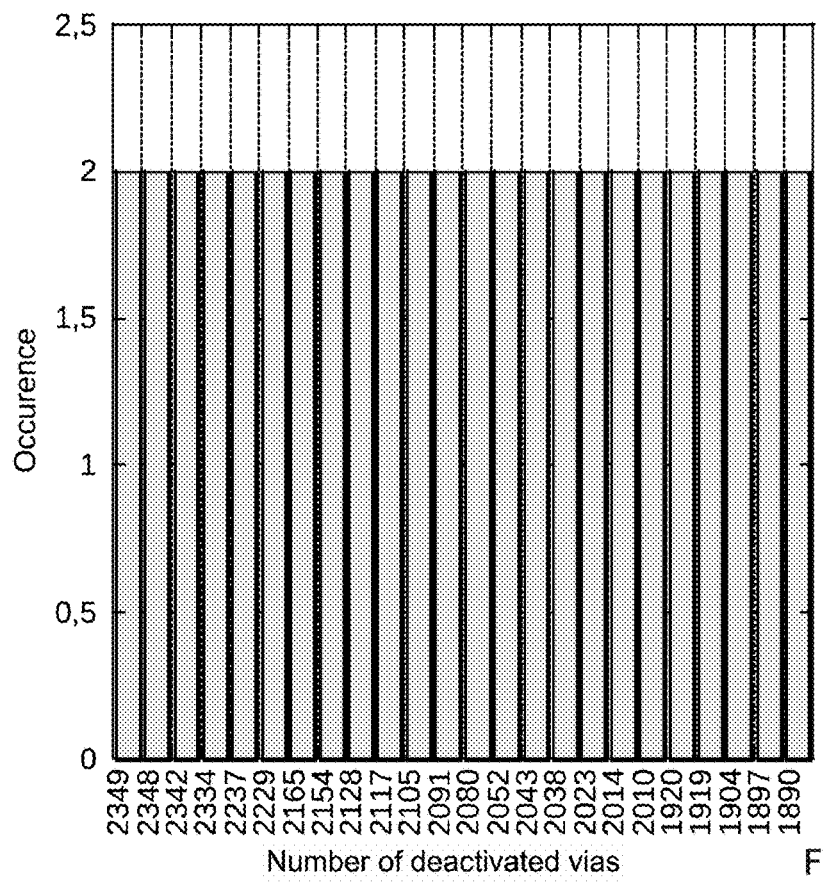
Figure 19D:
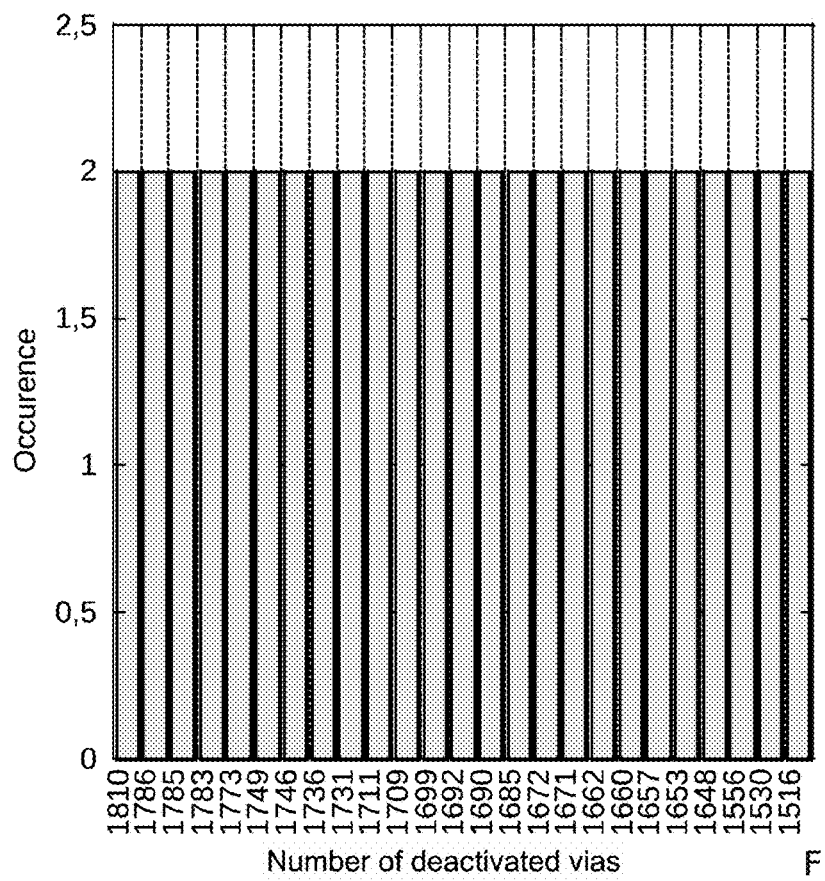

Thus, as is clear in FIG. 19A, on the batch of ten wafers, and therefore on a batch of 810 chips: 44 chips have a number of deactivated vias equal to 1508; 20 chips have a number of deactivated vias equal to 1866; 7 chips have a number of deactivated vias equal to 2353 etc.

At this stage, the question of a possible risk that two individualisation regions 1 might be identical could be posed, that is to say that the deactivated vias of two chips are identical in number and in coordinates.

It is possible, using a computer program, to compare all the coordinates of deactivated vias between all the chips in order to check that there is no identical chip.

For example, in the present case for the chips having 2353 deactivated vias, it is possible to determine which are these chips that have this number of deactivated vias. The chips are referenced as follows: (number of wafer, number along X of the chip on the wafer, number along Y of the chip on the wafer). The chips having 2353 deactivated vias are as follows:

(1,3,−3),(1,3,−2),(1,4,−1),(2,−3,−3),(2,−3,−2),(5,−4,−2),(6,−2,3)

Using the computer program for comparing the coordinates of the deactivated vias, it is seen that none of these 7 chips has the same organisation of deactivated vias. Thus the individualisation regions 1 of these 7 chips all give a different response and will make it possible to recognise each of these chips uniquely.

By reiterating this procedure over the 810 chips, obtained with the parameters of the above table, it turns out that none of the individualisation regions 1 of these chips is identical.

Thus the method proposed truly makes it possible to individualise each of these chips even though they were obtained using the same set of masks.

Examples of Parameters for Increasing the Capacity for Individualisation of the Chips The following paragraphs aim to present parameters that can be adjusted in order to increase the capacities for individualisation offered by the method according to the invention.

Variation of the Pitch of the Network of Patterns:

By increasing the period of the network of lines used for deactivating the network of vias, the number of vias deactivated is reduced, which makes it possible, from chip to chip, to reduce the capacities for individualisation.

According to one embodiment, provision is made for the network of patterns, for example of lines, not to be periodic. Thus the period between two successive patterns, e.g. between successive lines, may vary on the surface of the wafer, or even on the surface of the same individualisation region 1.

Preferably, this period varies randomly. In varying it may comply with a pre-established variation law, for example arithmetic, geometric, polynomial etc.

By way of non-limitative example, for a network of lines, the random period may be designed in the following manner. Let P be a predetermined period according to the implementation described previously for responding to the specifications of the individualisation requirements of the chips. This value P can easily be determined by means of computing software making it possible to evaluate the number of deactivated vias and the positions thereof (X and Y coordinates). In order to reinforce the unique character of the arrangement of the deactivated vias in each individualisation region 1, it is then possible to produce a network of inclined lines the pitch (P*) of which between two successive lines will not be constant. This pitch corresponds to the distance between the adjacent flanks of two patterns with the width of one of these patterns added, P* can for example be determined by the following equation:

$$P^* = P \times (1+r)$$

In this equation, r is a random number between −c and +c. For example c lies in an interval between [−0.2 and +0.2]. r is strictly greater than −1. r is a number determined by a random generator of available numbers. c will be chosen so that, in the configuration P*=P×(1−c), the network can be produced by the lithography technique identified for producing this network of lines. It is necessary in fact for the value P* to be compatible with the resolvent capacities in a dense network for the most critical case to be implemented. Moreover, the lowest value of P*, i.e. P*=P×(1−c), will have to be strictly greater than the width of the line, which imposes a constraint on the maximum value of c.

This example with variation of the pitch of the network of patterns applies whatever the pattern adopted. For example, it may in fact be a case of a pattern in one dimension: straight lines, curve line, spiral(s). In the latter case, provision is made for the distance between the turns of the spiral not to be constant. The radius of the spiral at one point is not proportional to the angle travelled on the spiral to reach this point.

It may also be a case of a pattern in two dimensions: individual patterns distributed over a network of dimensions, a grid formed by lines with intersections at a right angle or not, etc. Naturally, in the case where the lines form a grid with intersections at a right angle, it will be ensured that these lines are inclined with respect to the lines on which the network of vias is aligned.

Use of Positioning and/or Deformation Correction Coefficients:

Alternatively or combined with the previous embodiment, it is also possible to modify the correction parameters of the lithography equipment used for producing the via deactivation patterns.

In adjusting the lithography equipment, account may be taken of the overlap correction parameters, normally termed overlay correction parameters. These parameters normally aim to correct the positioning or deformation of the patterns that it is wished to produce in order to obtain patterns that are as identical as possible within the same chip or from one chip to another on the wafer.

In the context of the method proposed, these parameters can be used to locally modify, between the chips or within the same chip, the parameters of the network of patterns, typically the network of inclined lines. For this purpose, when the resin is exposed to define the patterns therein, correction coefficients are applied that are different from one chip to another, for the purpose of generating patterns that will be positioned and/or deformed differently between each chip. Thus, instead of using the overlay correction parameters in order to obtain identical patterns on a wafer, this embodiment aims, in a perfectly unusual manner, to intentionally degrade the coefficients that make it possible to control the overlay, with the purpose of increasing the differences in patterns within the same wafer.

These correction parameters are broken down into a model containing linear terms along the axes X or Y. According to the amplitude and application coordinates of these terms, it is possible to compensate for or generate at least one from: translation along X and/or Y; magnification along X and/or Y; rotation on the axis Z perpendicular to X and Y.

Figure 22:
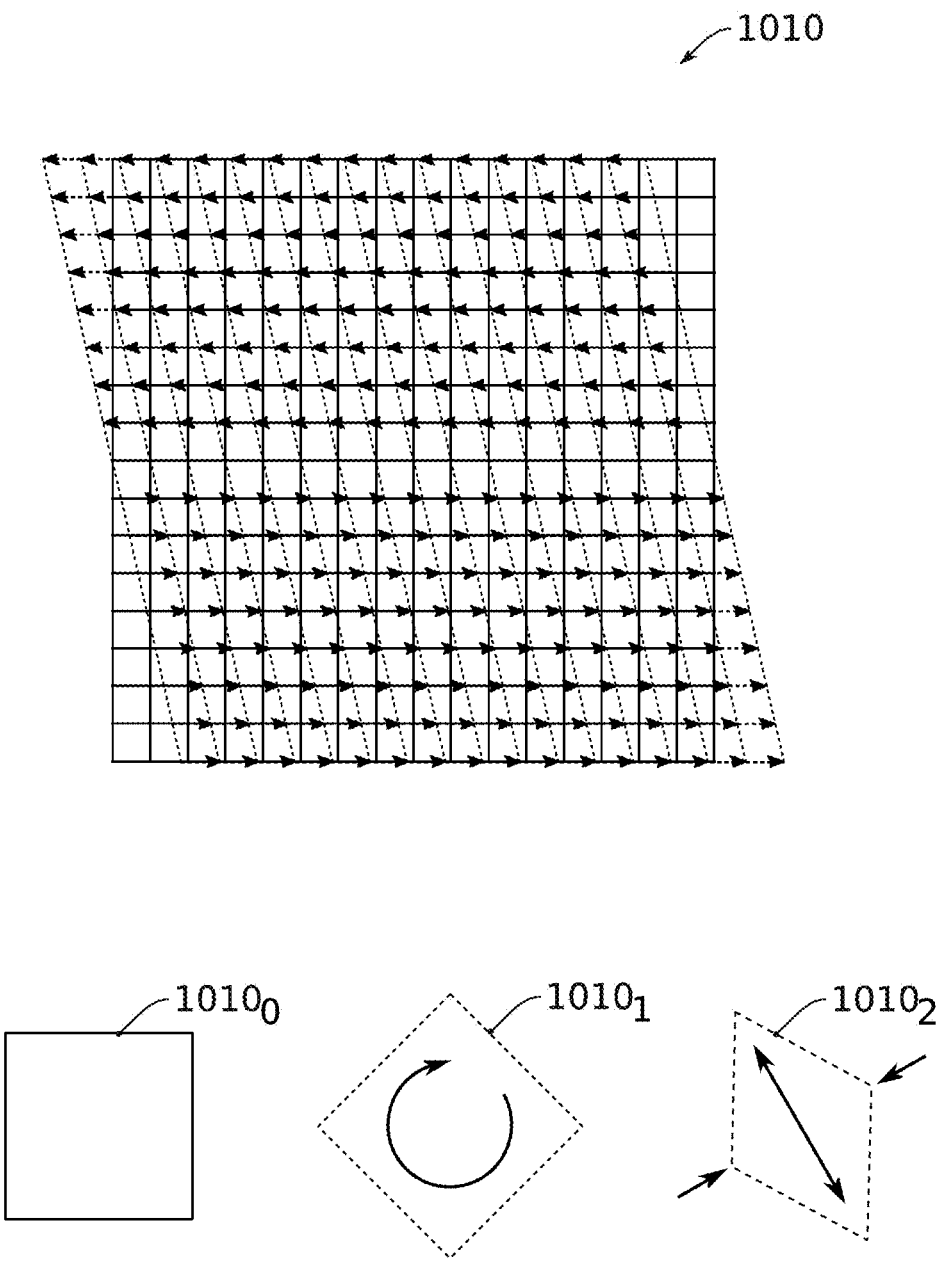

FIGS. 20, 21 and 22 illustrate examples of modification of the position and/or of the form of the patterns of a chip, obtained by acting on these correction parameters. In these examples, it will be considered that the deformed or moved contours correspond to the contours of the network of patterns covering the whole of the chip. Naturally, in the case where the patterns are formed solely on the individualisation region, these modifications or deformation of contours relate only to the individualisation region. FIG. 20 illustrates translations along the axes X or Y. The view from above illustrates the impact of this translation in a chip 1010. The view from below illustrates the impact of this translation at the chip 1010 in the wafer. The reference $1010_0$ corresponds to the position of the pattern network contour of the chip in the absence of correction parameters. The reference $1010_1$ corresponds to the position of the network of patterns after correction parameters along X are applied. The reference $1010_2$ corresponds to the position of the network of patterns in the chip after the correction parameters along Y are applied.

FIG. 21 illustrates magnifications along the axes X or Y. The view from above illustrates the impact of this deformation in a chip 1010. It can be seen therein that the initial mesh of the network of patterns is moved in the two opposite directions, along the axis X, on either side of the centre ($X_0$, $Y_0$) of the chip 1010. The reference $1010_0$ corresponds to the shape and the dimensions of the contour of the network of patterns of the chip in the absence of the application of correction parameters. The reference 1010 corresponds to a deformation implemented with the same amplitude on the axes X and Y. A magnification is then applied to the whole of the network of patterns of the chip $1010_1$. The reference $1010_2$ corresponds to a deformation implemented with a positive amplitude (magnification) along the axis X and with a negative amplitude (narrowing) along the axis Y.

FIG. 22 illustrates a rotation of the network of patterns made on the axis Z perpendicular to the axes X and Y. The view from above illustrates the impact of this rotation within a chip 1010. It can be seen therein that the initial mesh of the network of patterns is turned in the anti-clockwise direction and about the centre ($X_0$, $Y_0$) of the chip 1010. The reference $1010_0$ corresponds to the shape and to the dimensions of the network of patterns of the chip before correction parameters are applied. The reference $1010_1$ corresponds to a rotation of the network of patterns in an anticlockwise direction. Naturally, identical behaviours can be obtained by modifying the positioning and/or deformation coefficients on the axis Y.

Moreover, it is possible to combine variations in position and deformations along the axes X and Y.

For example, the reference $1010_2$ in FIG. 22 corresponds to a deformation of the network of patterns obtained by combining a rotation about the axis Z (rotation illustrated by the reference $1010_1$) and a narrowing along the axis Y.

It should be noted that corrections with higher orders such as the $2^{nd}$ order or the $3^{rd}$ may be used, on the axis X, on the axis Y or on a combination of these axes. For this purpose, it is necessary to refer to the technical specifications of the equipment used. All these combinations of applications of correction and positioning coefficients and/or of deformation of the patterns to be exposed in the resin, normally used for compensating for misalignments, may then be implemented to generate misalignments thereof with the objectives of creating patterns that will be different from chip to chip.

In the light of the above description, it is clear that the method proposed offers a particularly effective solution for producing an individualisation region of the PUF type. The invention is not limited to the embodiments described above and extends to all embodiments covered by the claims.

The embodiment described above relates to the manufacture of semiconductor compounds at the so-called "copper" back end. The invention nevertheless extends to embodiments using a conductive material other than copper. For this purpose, a person skilled in the art will without difficulty be able to make the necessary adaptations in terms of choice of materials and method steps.

The invention claimed is:

1. A method for producing on a wafer a plurality of chips each comprising an integrated circuit comprising an individualization region, each chip comprising:
   a first and a second level of electrical tracks,
   an interconnections level located between the first and second levels of the electrical tracks and comprising vias intended to electrically connect electrical tracks of the first level with electrical tracks of the second level,
   the method comprising at least the following steps implemented simultaneously for a plurality of chips on the wafer:
   providing at least the first level of the electrical tracks and a dielectric layer covering the first level,
   producing on the dielectric layer a hard mask having openings located in line with the electrical tracks and making the dielectric layer accessible,
   producing, in a region of the chip that includes the individualization region, patterns conformed causing:
   first openings of the hard mask are not masked by the patterns leaving the dielectric layer accessible in line with the first openings, and
   second openings of the hard mask are masked by the patterns, an arrangement of the patterns being different for each of the chips of the plurality of chips of the wafer,
   producing via openings in the dielectric layer in line solely with the first openings baring the electrical tracks of the first level,
   filling in the via openings with an electrically conductive material forming vias in line solely with the first openings of the hard mask,
   producing the second level of the electrical tracks on the vias.

2. The method of claim 1, wherein the arrangement of the patterns differs from one chip to another in the plurality of chips through at least one of the following parameters:
   position of the patterns on the chip,
   dimensions of the patterns,
   pitch of the patterns.

3. The method of claim 1, wherein the electrical tracks of the first level extend along parallel lines, the electrical tracks of the second level extend along parallel lines perpendicular to the electrical tracks of the first level, the patterns extending along lines parallel to each other and inclined with respect to the electrical tracks of the first and of the second level.

4. The method of claim 1, wherein the patterns form at least one curve on the wafer, the patterns forming one or more spirals extending over the wafer.

5. The method of claim 1, wherein the patterns form a non-periodic network.

6. The method of claim 1, wherein a pitch between two adjacent patterns varies within the same chip.

7. The method of claim 1, wherein a pitch between two adjacent patterns varies within the same wafer.

8. The method of claim 1, wherein a number r is determined randomly, a pitch between two adjacent patterns on the same wafer varying as a function of the number r.

9. The method of claim 1, wherein the step of producing the patterns is implemented by means of lithography equipment, and wherein, during the step of producing the patterns, deformation and/or positioning corrections are applied to this equipment causing variation of the position and/or dimensions of the patterns within a chip and/or within a wafer.

10. The method of claim 1, wherein each chip has at least one other region, distinct from the individualization region, forming a functional region for each chip.

11. The method of claim 10, wherein the first and the second levels of electrical tracks as well as the interconnection level extend in said at least one other region.

12. The method of claim 11, wherein, prior to the production of the patterns, a protective mask is formed on the region intended to form the functional region, this protective mask not covering the region of the chip intended to comprise the individualization region, this protective mask preventing said step of producing the via openings of the dielectric layer.

13. The method of claim 1, wherein use is made of a lithography mask for producing the patterns on a plurality of chips of a first wafer and this same lithography mask is used for producing patterns on a plurality of chips of a second wafer different from the first wafer.

14. The method of claim 13, wherein the lithography mask is positioned, in relation to the first wafer, in accordance with a first positioning producing the patterns on the first wafer, and the lithography mask is positioned in relation to the second wafer according to a second positioning, different from the first positioning, producing the patterns on the second wafer.

15. The method of claim 14, wherein, the lithography mask is pivoted about an axis substantially perpendicular to a plane wherein a front face of the hard mask mainly extends.

* * * * *